United States Patent [19]

Jones

[11] Patent Number: 5,081,763
[45] Date of Patent: Jan. 21, 1992

[54] AUTOMATED DRILLING STATION

[75] Inventor: Everett E. Jones, Wichita, Kans.

[73] Assignee: The Boeing Company, Seattle, Wash.

[21] Appl. No.: 358,429

[22] Filed: May 30, 1989

[51] Int. Cl.⁵ .......................................... B23Q 3/157
[52] U.S. Cl. .................................. 29/568; 279/1 M;
408/6; 408/11; 408/12; 408/15; 408/72 B;
408/97; 408/241 B
[58] Field of Search ............ 29/26 A, 568; 279/1 M;
408/3, 6, 11, 12, 15, 44, 51, 52, 72 B, 88, 89, 95,
97, 98, 241 B

[56] References Cited

U.S. PATENT DOCUMENTS

| | | | |
|---|---|---|---|
| 2,327,407 | 8/1943 | Edyvean | 409/138 |
| 3,238,624 | 3/1966 | McCabe | 408/3 X |
| 3,292,493 | 12/1966 | Franklin | 409/138 |
| 3,922,951 | 12/1975 | Linsinger | 409/138 |
| 4,018,134 | 4/1977 | Linsinger | 409/138 |
| 4,088,417 | 5/1978 | Kosmowski | 408/43 X |
| 4,092,719 | 5/1978 | Salmon | 364/468 |
| 4,168,567 | 9/1979 | Leguy et al. | 29/568 |
| 4,280,775 | 7/1981 | Wood | 408/3 |
| 4,297,927 | 11/1981 | Kuroda | 83/36 |
| 4,589,805 | 5/1986 | Duffner | 408/21 |
| 4,602,541 | 7/1986 | Benzinger et al. | 83/36 |
| 4,614,137 | 9/1986 | Jones | 279/1 ME X |
| 4,622,871 | 11/1986 | Van Sickle et al. | 408/714 X |
| 4,706,948 | 11/1987 | Kroecher | 269/34 |
| 4,909,678 | 3/1990 | Kakimoto | 408/95 X |

Primary Examiner—Z. R. Bilinsky
Attorney, Agent, or Firm—Finnegan, Henderson, Farabow, Garrett & Dunner

[57] ABSTRACT

An automated drilling station for use in a computer controlled manufacturing system comprising an adjustable frame structure for releasably clamping a work piece in a planar work position, a chuck assembly adapted to operatively receive a selected drill bit, a drive train for selectively moving the chuck assembly on an axis perpendicular to the plane of the work position, feed racks for storing a plurality of drill bits of various predetermined sizes, a robot assembly for transferring a selected drill bit between the feed racks and the chuck assembly at a transfer station remote from the work position, a drive train for selectively translating the chuck assembly between the transfer station and work position and between locations on one side of the work piece aligned with predetermined drilling locations in the work position and a selectively rotatable turret having bushings of various sizes disposed about the periphery thereof for selective disposition in opposed relation to the chuck assembly at each predetermined drilling locations.

31 Claims, 15 Drawing Sheets

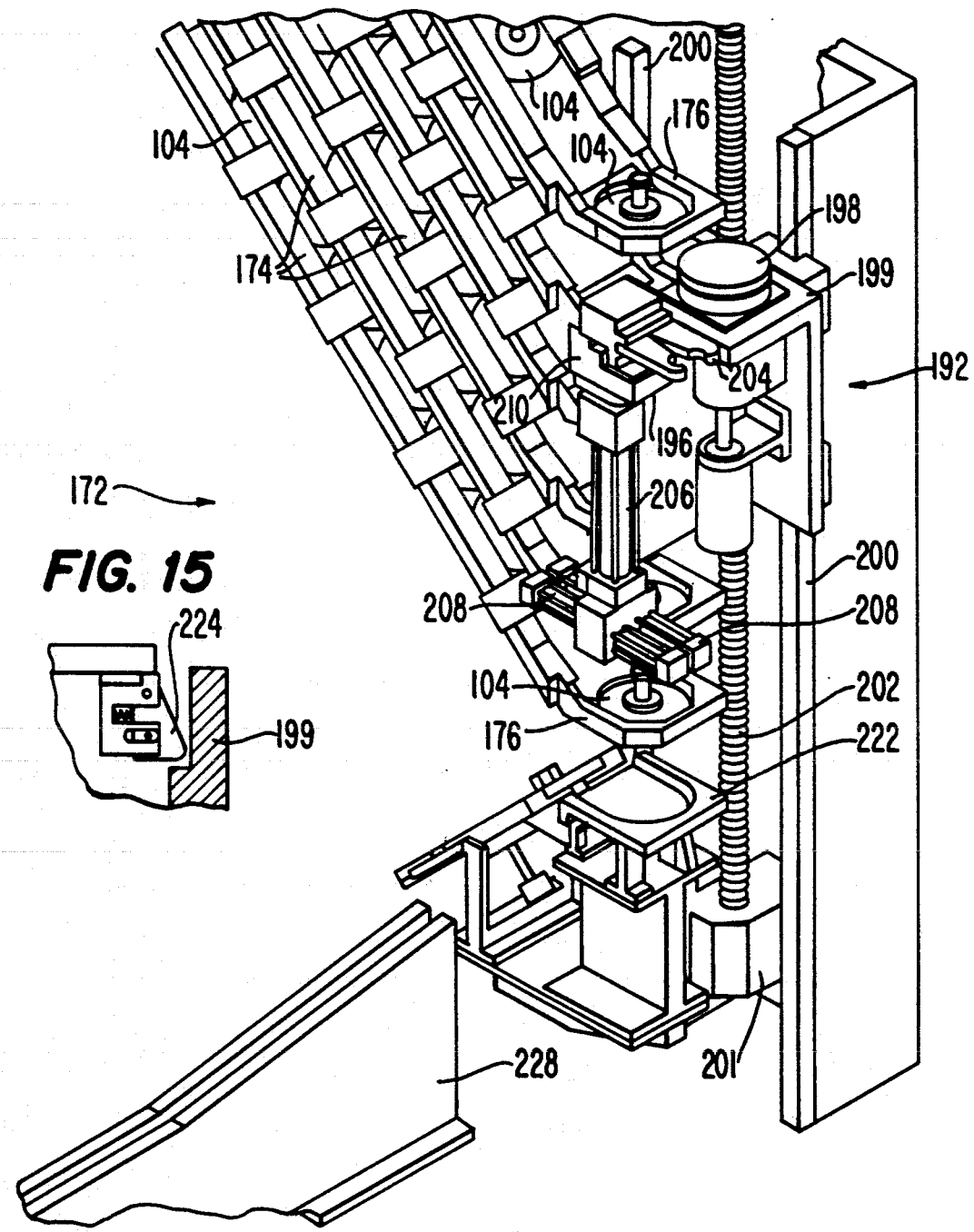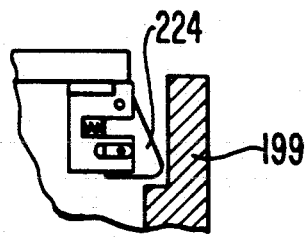
FIG. 11
FIG. 15

AUTOMATED DRILLING STATION

BACKGROUND OF THE INVENTION

1. Field of the Invention

The invention is an automated drilling station and, more particularly, a drilling station for use as a part of a computerized manufacturing facility.

2. Description of Related Information

Automated, computer-controlled manufacturing systems are known. Exemplary of such systems and associated work stations are U.S. Pat. Nos. 3,845,286, 4,369,563, 4,272,812, 4,342,088, 4,427,431, 4,237,598, Re. 25,886, Re. 25,956, Re. 26,770, 3,052,011, 3,010,371, 3,049,247, 3,188,736 and 3,709,623.

The present invention provides an automated, computer-controlled drilling station for performing drilling operations on sheet metal parts and the like. The invention is particularly designed for use in conjunction with the system broadly described in U.S. Pat. No. 4,700,308 to the same inventor.

Advantages of the invention are set forth in part in the description which follows, and in part will be obvious from the description, or may be learned by practice of the invention.

SUMMARY OF THE INVENTION

The advantages of the invention may be realized and attained by means of the instrumentalities and combinations particularly pointed out in the appended claims.

The invention, as embodied and broadly described herein, is an automated drilling station for use in a computer controlled manufacturing system comprising means adjustably defining a planar work position having a central reference point for releasably clamping a planar work piece in the work position, a chuck assembly adapted to operatively receive a selected drill bit, means for selectively moving the chuck assembly on an axis perpendicular to the plane of the work position, means for storing a plurality of drill bits of various predetermined sizes, means for transferring the selected drill bit between the storing means and the chuck assembly at a transfer station remote from the work position, means for selectively translating the chuck assembly between the transfer station and the work position and between locations on one side of the work piece aligned with predetermined drilling locations in the work position, and means for selectively disposing a bushing having a size corresponding to the selected drill bit on the other side of the work piece aligned with the predetermined drilling locations in opposed relation to the chuck assembly.

BRIEF DESCRIPTION OF THE DRAWINGS

The accompanying drawings, which are incorporated in and constitute a part of the specification, illustrate embodiments of the invention, and, together with the description, serve to explain the principles of the invention.

FIG. 11 is a perspective view of the drill bit storing and transfer apparatus which is part of the invention.

FIG. 15 is a close up cut-away view of the latch mechanism of the apparatus depicted in FIG. 14.

DESCRIPTION OF THE PREFERRED EMBODIMENT

Reference will now be made in detail to the present preferred embodiments of the invention, examples of which are illustrated in the accompanying drawings.

The automated drilling station is particularly intended for use in conjunction with a computer controlled manufacturing system. The concept of work piece orientation in such a system and in the automated drilling station is disclosed in U.S. Pat. No. 4,700,308. The computer control mechanism and software for operating the computer controlled manufacturing system and for operating the automated drilling station of the invention is disclosed in co-pending U.S. patent application, Ser. No. 226,552, filed July 29, 1988, which application is hereby specifically incorprated herein by reference.

Figure 1:
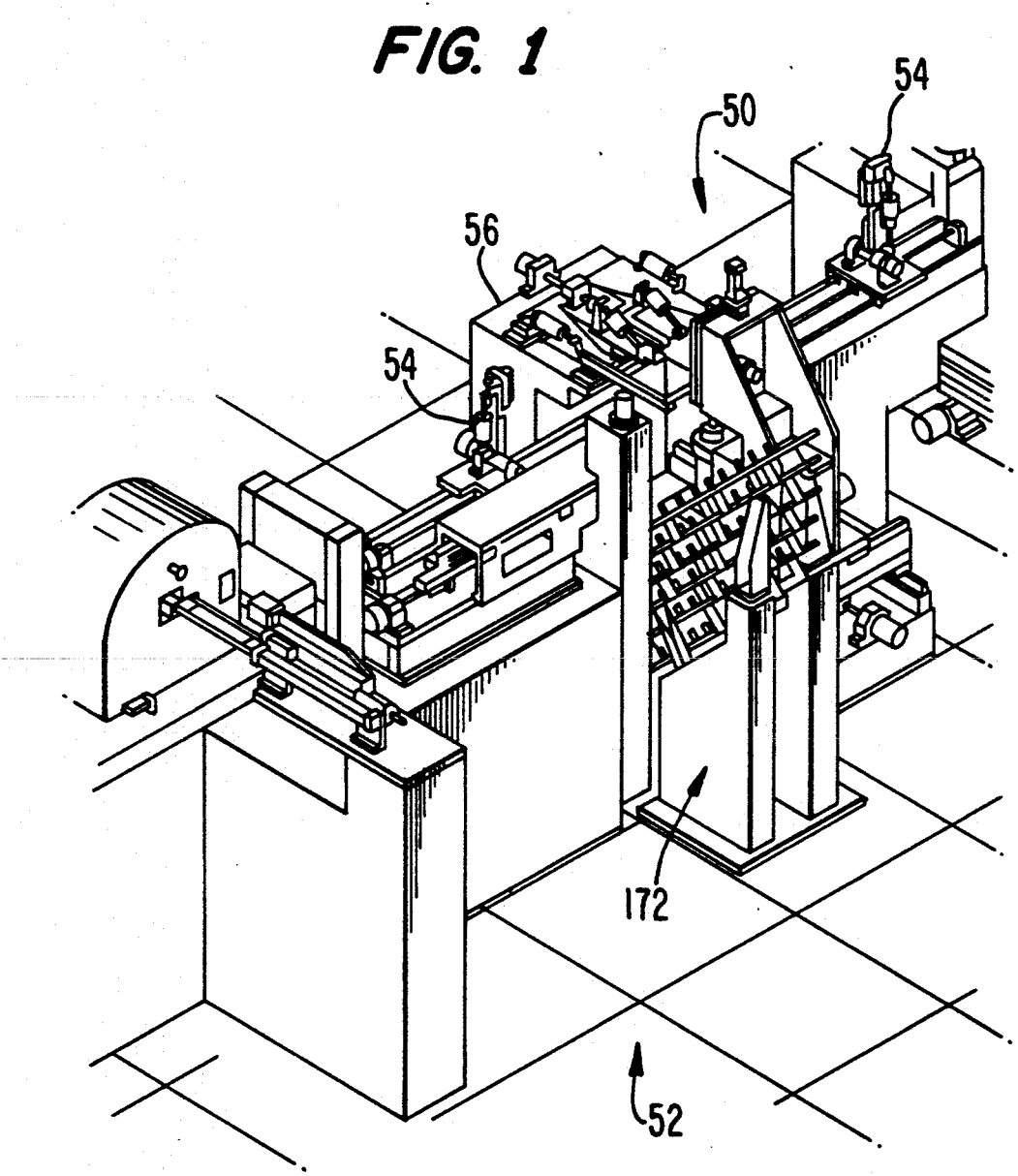
FIG. 1 is a perspective view of a computer controlled manufacturing system incorporating the automated drilling station of the invention.

As depicted in FIG. 1, automated drilling station 50 is preferably incorporated as one station in a series of functional stations in a computer controlled manufacturing system 52. As described in co-pending application Ser. No. 226,552 and U.S. Pat. No. 4,700,308, work pieces are carried between individual stations in the manufacturing system 52 by means of robots 54 whose position and function is controlled by a computer. The subject invention may be used as a computer controlled drilling station independent of an overall manufacturing system and may have work pieces placed within the drilling station of the invention either manually or by mechanical means other than robots.

In accordance with the invention, the automated drilling station comprises means adjustably defining a planar work position having a central reference point for releasably clamping a planar work piece in the work position. As embodied herein and depicted in FIGS. 1, 2 and 3, the clamping means comprises a base 56, a cantilever frame 58 including opposed side elements 60 extending in cantilever fashion from base 56 to a first support ledge 62 remote from base 56, and a second support ledge 64 movably disposed on base 56 in spaced opposition to first support ledge 62. Side elements 60 and support ledges 62, 64 define the periphery of a work position which is generally in the plane of intersecting X and Y axes 66, 68, respectively, (best seen in FIG. 6). The intersection of X and Y axes 66, 68 define a reference point in the plane of the work position.

Figure 2:
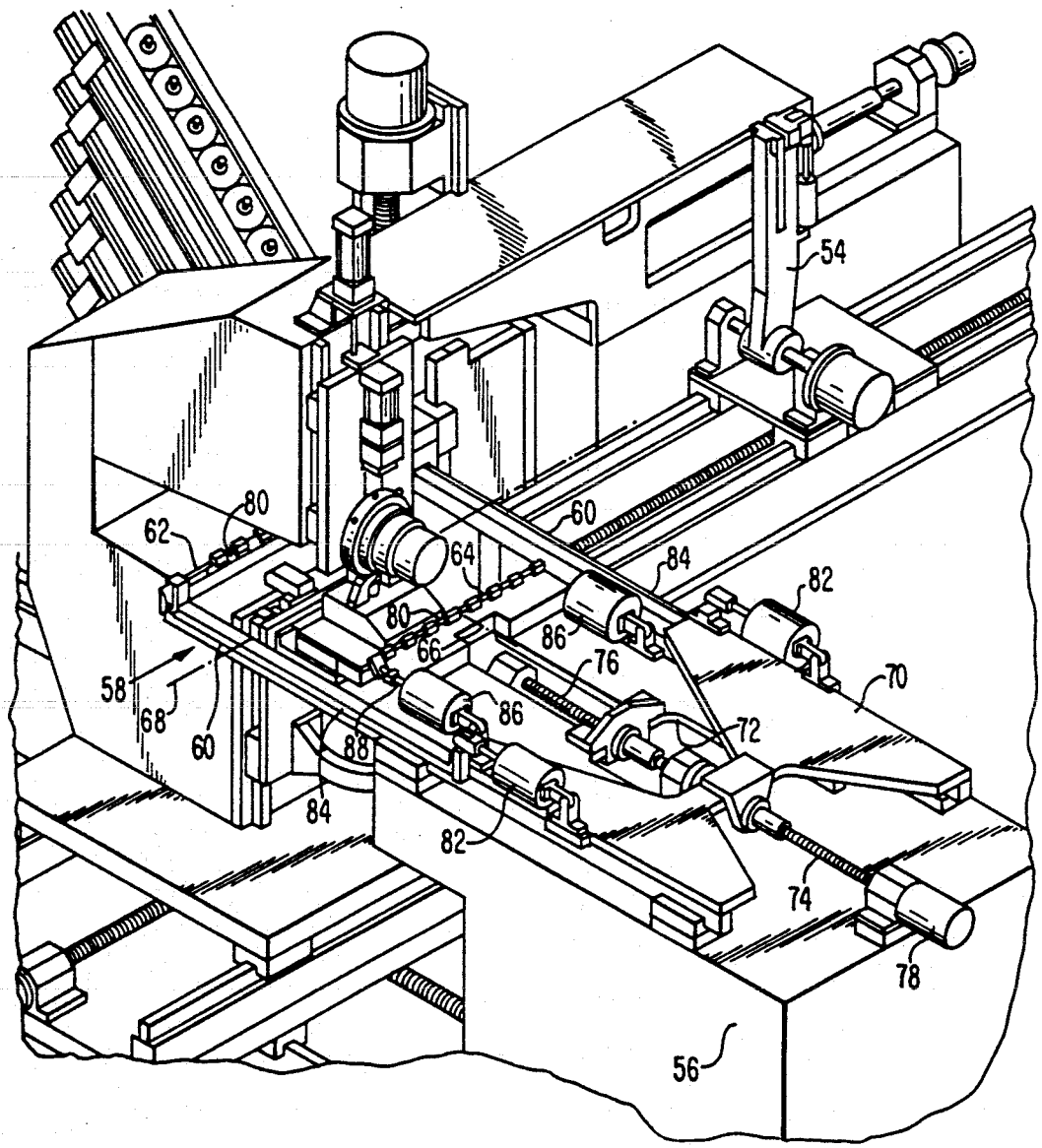
FIG. 2 is a perspective view of the automated drilling station of the invention in the drilling position.
Figure 3:
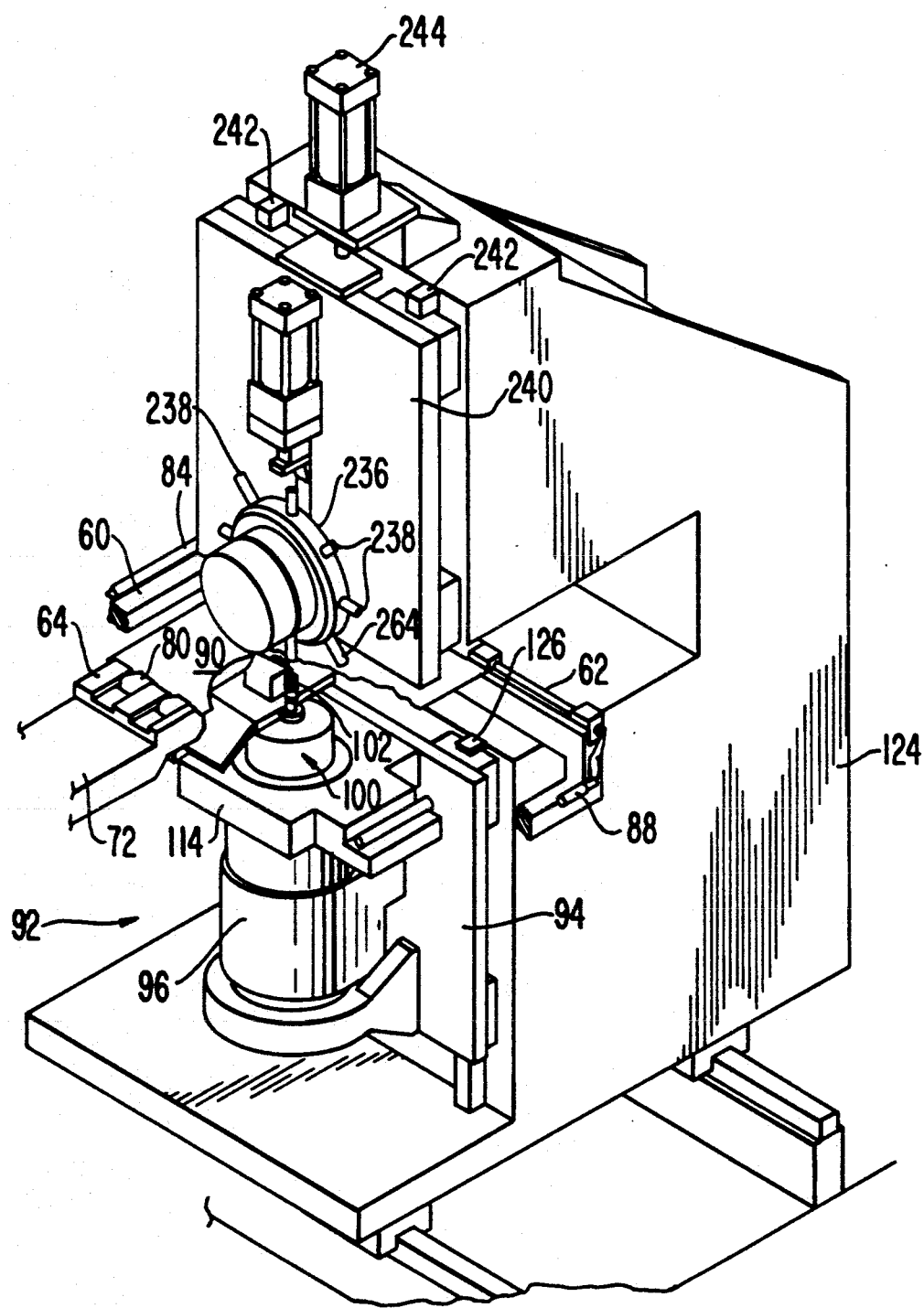
FIG. 3 is a partially cut-away perspective view of a portion of the automated drilling station in the drilling position.

The clamping means further comprises means responsive to the dimensions of a work piece for proportionally varying the spacing between the support ledges to maintain equidistant spacing from the reference point and to receive opposed edges of the work piece. As seen in FIG. 2, side elements 60 and first ledge 62 are integrally connected to frame 70 which is slidably disposed on base 56. Second support ledge 64 is integrally connected to frame 72 disposed on base 56 for slidable telescopic movement with respect to frame 70. Frames 70, 72 are drivingly interconnected by joined ball screws 74, 76 threadably received in frames 70, 72, respectively. Ball screws 74, 76 have opposite threads and are connected to drive motor 78 such that rotation of screws 74, 76 by drive motor 78 provides equal and opposite movement of frames 70, 72 and, thereby moves first and second ledges 62, 64. Thus, a computer signal representative of the transverse X axis dimension of a work piece to drive motor 78 adjusts the transverse X axis spacing between ledges 62, 64. This defines the peripheral dimensions of the work position for that work piece while maintaining equidistant spacing from the reference point defined by the intersection of X and Y axes.

The clamping means further comprises a clamp 80 attached to each ledge 62, 64 for movement on the X axis with its respective ledge. Means are provided for shifting clamps 80 between a clamped position which secures the work piece to ledges 62, 64 in the work position, and an open position permitting removal of the work piece. As seen in FIG. 2, the clamp shifting means includes command cylinders 82 connected by actuating lever assemblies 84 for moving clamp 80 on first ledge 62 between open and clamped positions. Command cylinders 82 are attached to frame 70 for movement therewith. Similarly, command cylinders 86, attached to frame 72 for movement therewith, are connected by actuating levers 88 to clamp 80 on second ledge 64 to move clamp 80 between open and clamped positions. Thus, once robot 54 places a work piece 90 (FIG. 3) in the work position defined by the adjusted ledges 62, 64 and side elements 60, a sensor provides a signal to command cylinders 82, 86 to close the clamps on the work piece. The reverse is effected by a signal to the command cylinders on completion of work on the work piece in the work position.

In accordance with the invention, the automated drilling station comprises a chuck assembly adapted to operatively receive a selected drill bit. As embodied herein and depicted in FIGS. 3, 4, 5 and 6, chuck assembly 92 comprises support plate 94, drive motor 96 supported by support plate 94 and including drive shaft 98 selectably rotatable by drive motor 96, and a chuck 100 for fixably receiving a selected drill bit 102.

Preferably, each of a plurality of drill bits 102 includes an adaptor 104 comprising a generally planar annular base 106 and an integral shaft 108 extending from the center of one side of base 106 to a distal end at which drill bit 102 is removably secured by known methods. Preferably, as will be explained later, shaft 108 includes annular recess 110 for gripping adaptor 104.

Figure 4:
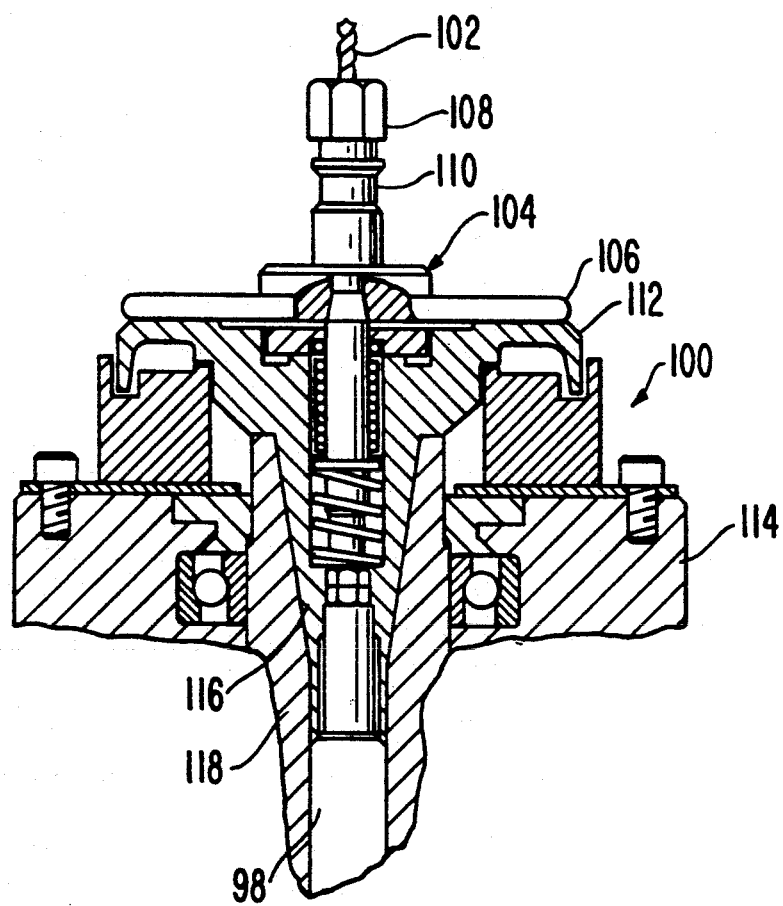
FIG. 4 is a cross-section side view of the drill bit chuck portion of the invention.

In a preferred embodiment, chuck 100, as depicted in FIG. 4, includes armature 112 rotatably mounted on plate 114 extending from support plate 94. Armature 112 includes a centrally depending portion 116 for driving engagement with quill 118 fixed to drive shaft 98. Armature 112 preferably includes an electromagnetic system providing means for magnetically holding drill bit adaptor 104 to chuck 100 in a manner as taught in U.S. Pat. No. 4,614,137. While the electromagnetic system for attaching an adaptor to the armature for rotation therewith is preferred for reasons which will be apparent in further discussions, other methods may be used.

Figure 5:
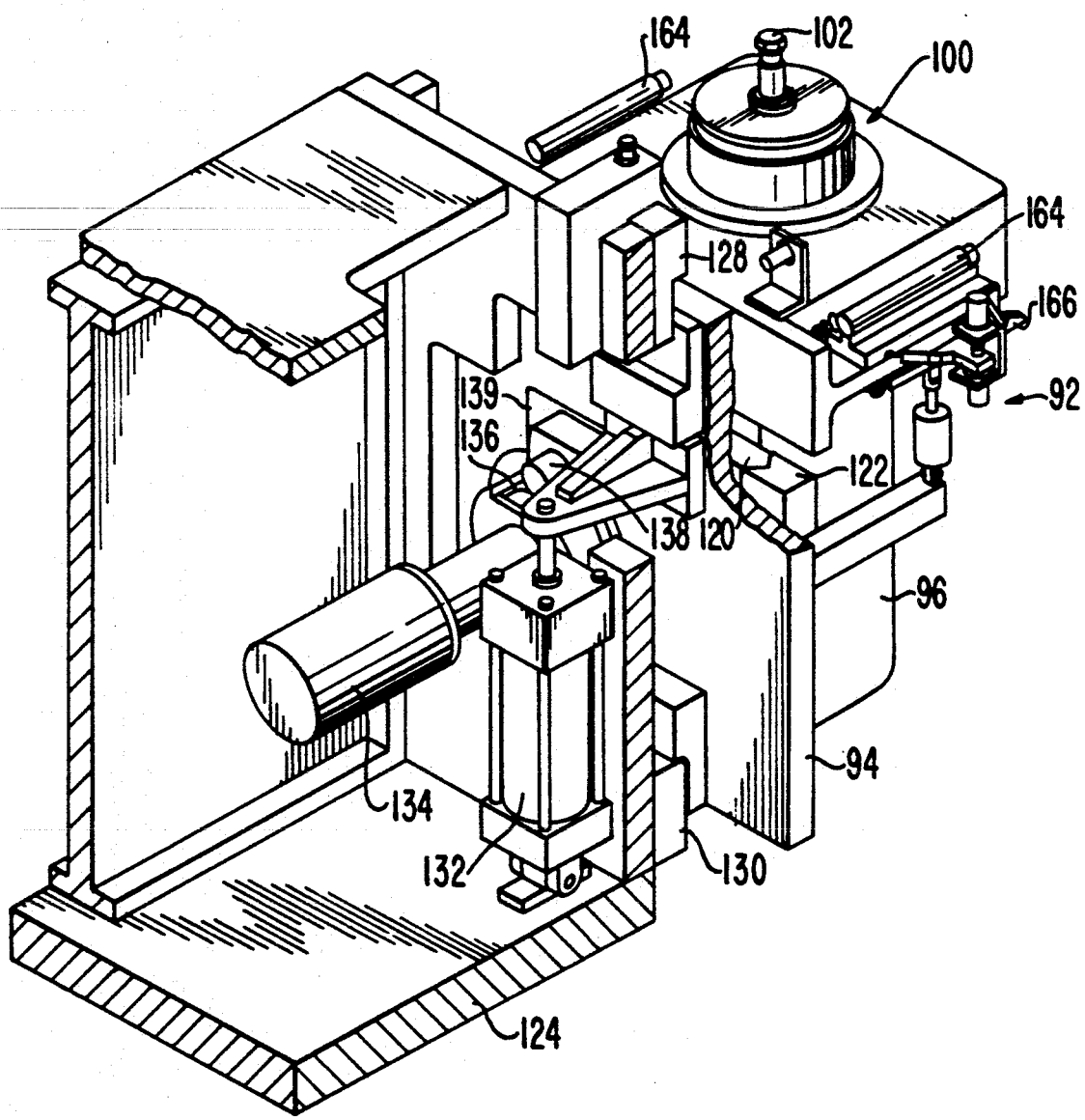
FIG. 5 is a partially cut-away perspective view of the chuck assembly and support portion of the invention.

As seen in FIG. 5, preferably drive motor 96 is slidably fixed to support plate 94 for relative movement on a cam axis perpendicular to the plane of the work position. Drive motor 96 is fixed to plate 120 which is slidably received in plate 122 fixed to support plate 94. Thus drive motor 96 and chuck 100 may be moved along the cam axis relative to support plate 94.

In accordance with the invention, the automated drilling station comprises means for selectively moving the chuck assembly on an axis perpendicular to the plane of the work position. As here embodied and depicted in FIGS. 3, 5 and 6, chuck assembly 92 is slidably fixed to housing 124 by means of ways 126 engaging complementary grooves on support plate 94. This structure permits movement of chuck assembly 92 relative to housing 124 on an assembly axis parallel to the cam axis and perpendicular to the plane of the work position between axially-spaced stops 128, 130. Power cylinder 132 mounted within housing 124 interconnects housing 124 with support plate 94 and provides power for selectively moving support plate 94 along ways 126 between stops 130 and 128. In FIG. 5, power cylinder 132 has been retracted abutting support plate 94 against stop 130.

The moving means further comprises cam drive means for selectively reciprocating chuck 100 and drive motor 96 along the cam axis in an axial stroke relative to mounting plate 94. As depicted in FIG. 5, the cam drive means comprises a cam drive motor 134 supported by housing 124 and a cam 136 drivingly connected to motor 134. The cam drive means further includes a cam follower 138 fixed to plate 120 and projecting through slot 139 in support plate 94. Cam follower 138 is disposed for operative engagement with cam 136 whereby selective rotation of cam drive motor 134 selectively reciprocates plate 120, motor 96 and chuck 100 relative to support plate 94 along the cam axis. As will be apparent from the discussion below, the cam driven movement of motor 96 and chuck 100 is used in conjunction with repetitive drilling of holes in a work piece whereas movement of support plate 94 and chuck assembly 92 by power cylinder 132 is used in conjunction with movements of housing 124 and during changing of work pieces.

Figure 9:
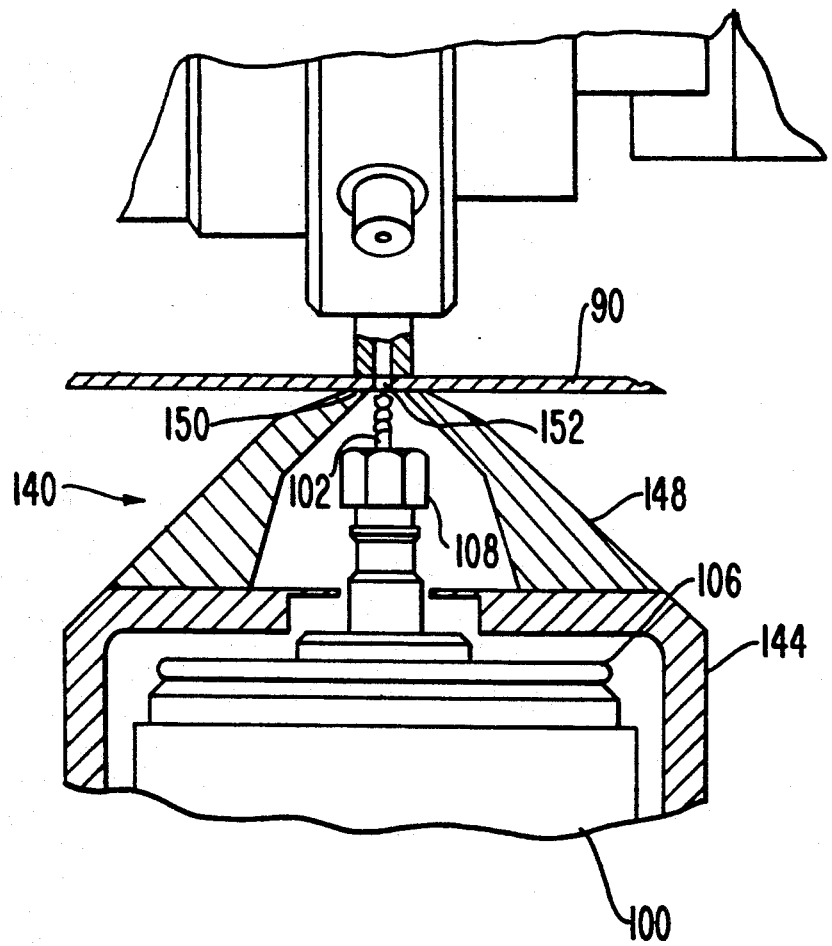
FIG. 9 is a cross-sectional view of the chuck, drill guard and bushing turret in position for drilling.

Preferably, the drilling station of the invention includes a drill guard selectively connectable to the chuck assembly for disposition between the chuck assembly and the one side of the work piece in the work position. Drill guard 140 depicted in FIGS. 6-9 includes plate 142 having a raised central portion 144 shaped to receive chuck 100 with adapter 104 mounted thereon. The surface of raised portion 144 has a slot 146 for receiving shaft 108 of adaptor 104. U-shaped guard element 148 is fixed on the surface of raised portion 144. Guard element 148 includes a contact surface 150 disposed, as seen in FIG. 9, to contact the one surface of work piece 90. Contact surface 150 includes bore 152 for passage of drill bit 102.

Base 56 supports drill guard 140 in a position proximate the work position and below the plane of the work position. Parallel guides 154 are fixed to and extend from base 56 and are disposed for supporting insertion into one end of ports 156 fixed to plate 142. A spring biased dog 158 is associated with each guide 154 to engage catches 160 on plate 144. Solenoid 162 permits selective disengagement of dogs 158 from catches 160.

Figure 7:
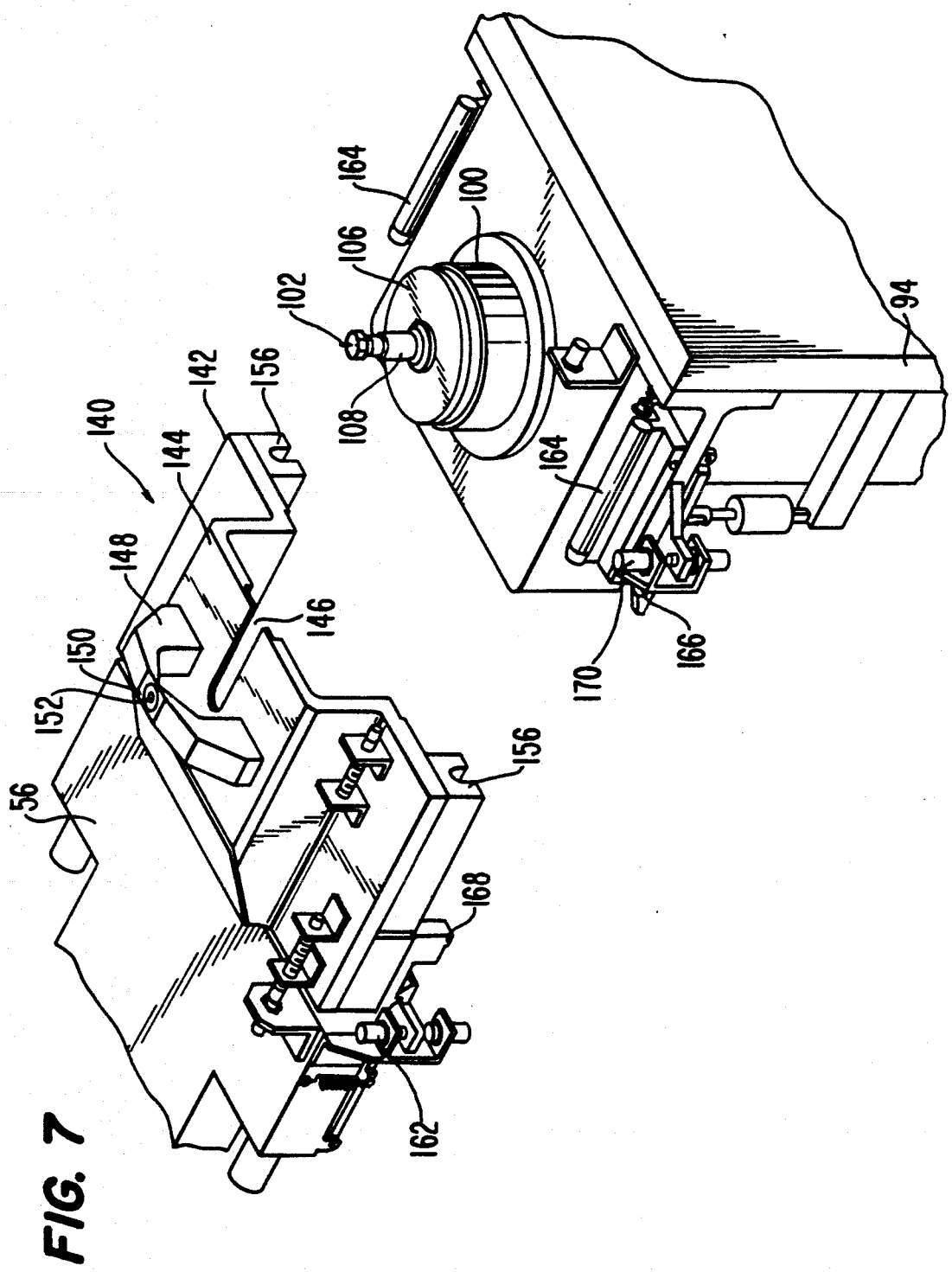
FIG. 7 is a perspective view depicting the chuck assembly in relation to the drill guard.
Figure 8:
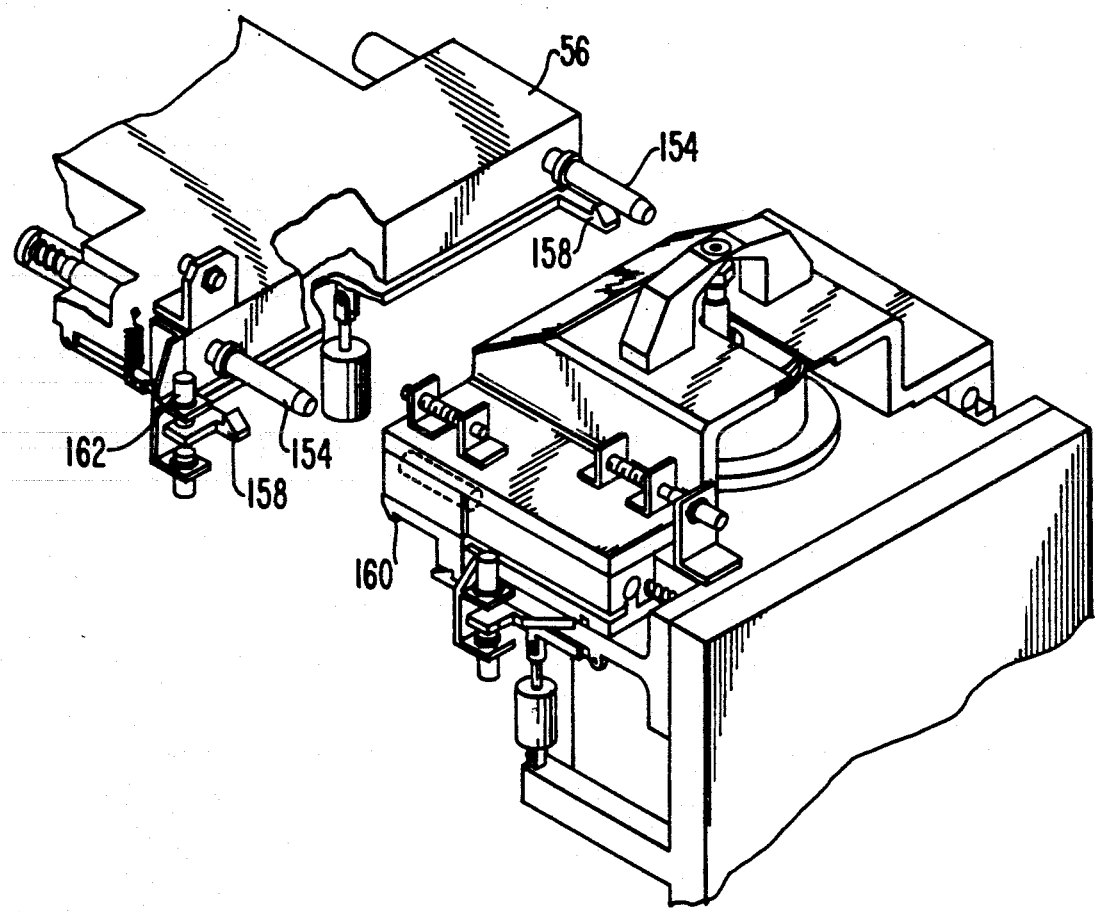
FIG. 8 is a perspective view depicting the chuck assembly and the engaged drill guard.

Support plate 94 includes means for engaging guard element 148. As depicted in FIGS. 5 and 7, guides 164 are fixed to support plate 94 and are disposed to slidably and supportably engage the other ends of ports 156 on plate 142. Dogs 166 fixed to support plate 94 are disposed to engage catches 168 and solenoid 170 provides means to selectively disengage dogs 166 from catches 168. By this structure, drill guard 140 may be selectively engaged on support plate 94 in a position overlying chuck 100 wherein bore 152 is coaxial with drill bit 102. Sensors, determining engagement of drill guard 140 by support plate 94, signal solenoids 162 to release drill guard 140 from base 56. The drill guard can be retained by support plate 94 in its operative position relative to chuck 100 and drill bit 102 until it is necessary to change the drill bit.

During a drilling operation with drill guard 140 installed in overlying relationship on chuck 100, contact surface 150 of drill guard 140 engages the one side of work piece 90. Drill guard 140 provides sufficient space for axial movement of chuck 100 generated by rotation of cam 136 against cam follower 138 to selectively drill holes in work piece 90 through bore 152.

In accordance with the invention, the automated drilling station comprises means for storing a plurality of drill bits of various predetermined sizes. As depicted in FIG. 1, the storing means includes a feed rack assembly 172 disposed adjacent a transfer station. As depicted in FIG. 11, feed rack assembly 172 includes a plurality of feed racks 174, each of which includes a terminal platform 176. Each feed rack 174 is adapted to contain a plurality of adaptors 104 each including drill bit 102 of one predetermined size. Thus, feed rack assembly 172 containing six feed racks 174 provides means for storing a plurality of adaptors or drill bits of six different sizes. Feed racks 174 are so disposed that gravity biases the adaptors contained therein toward their respective terminal platform 176. Racks 174 are further disposed such that terminal platforms 176 of all feed racks are aligned along the same axis. Each feed rack 174 includes means for selectively permitting only one adaptor at a time to move to its respective terminal platform.

Figure 13:
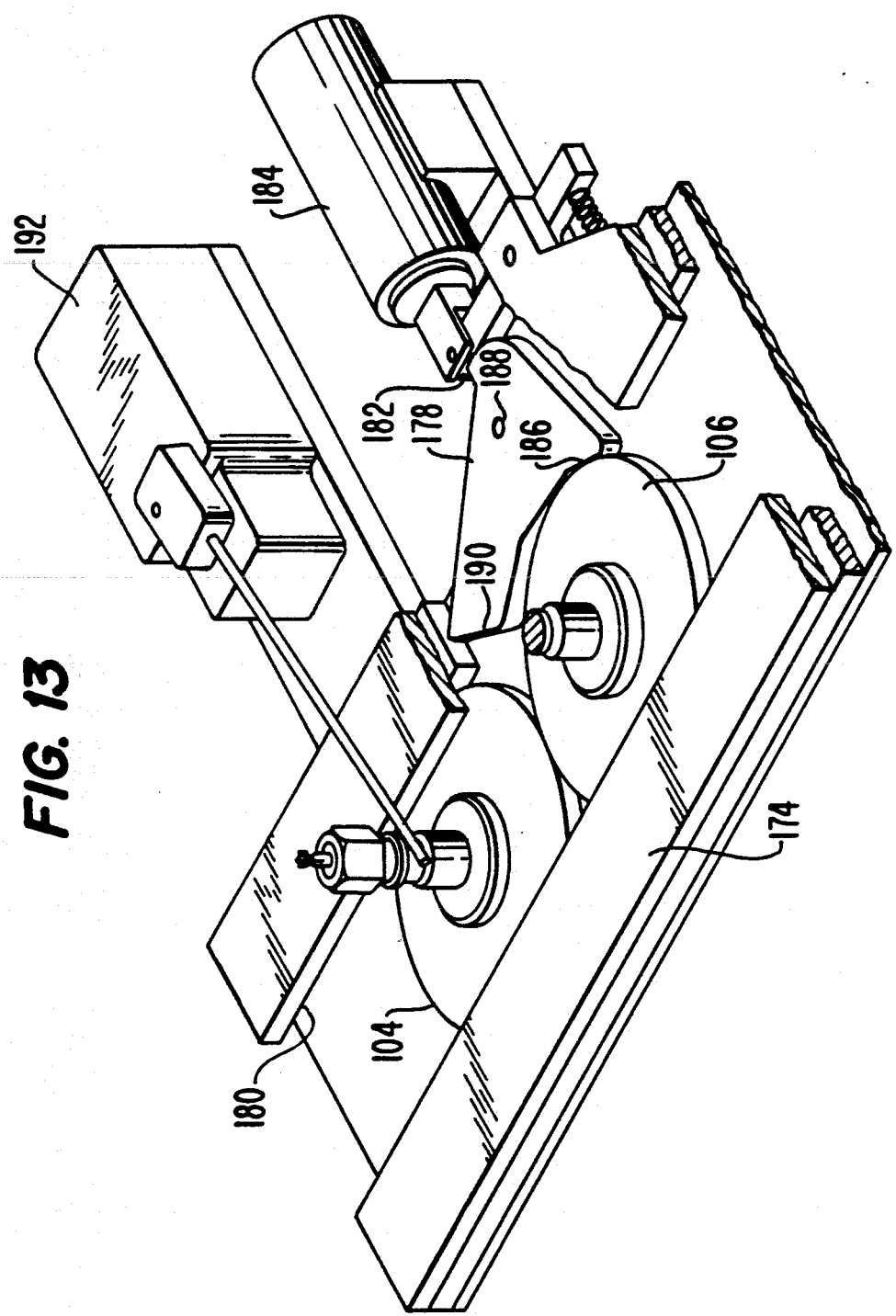
FIG. 13 is a partial cut-away perspective view of the feed and control mechanism in the drill bit storage apparatus of the invention.

Preferably, as depicted in FIG. 13, each feed rack 174 includes cam element 178 pivotally attached to feed rack 174 in spaced relation to its respective terminal platform 176. Cam element 178 is disposed to engage base 106 of an adaptor 104 located in channel 180 defined by feed rack 174. Cam element 178 is held in engaging position by spring biased dog 182 which is selectably disengageable from cam element 178 by solenoid 184. On selective release of dog 182, gravity acting on adaptor 104 pushes against face 186 pivoting cam element 178 about pivot 188 and allowing adaptor 104 to slide forward in channel 180 to terminal platform 176. The following adaptor 104 slides down channel 180 engaging sloped face 190 of cam element 178 pivoting cam element 178 to place face 186 in position to engage the following adaptor 104 and prevent its continued travel down channel 180. Spring biased dog 182 then engages cam element 178 to hold the following adaptor 104 in the ready position.

Preferably the storing means also includes sensor element 192 which determines whether there is an adaptor 104 in channel 180 following the adaptor engaged by cam element 178.

Figure 6:
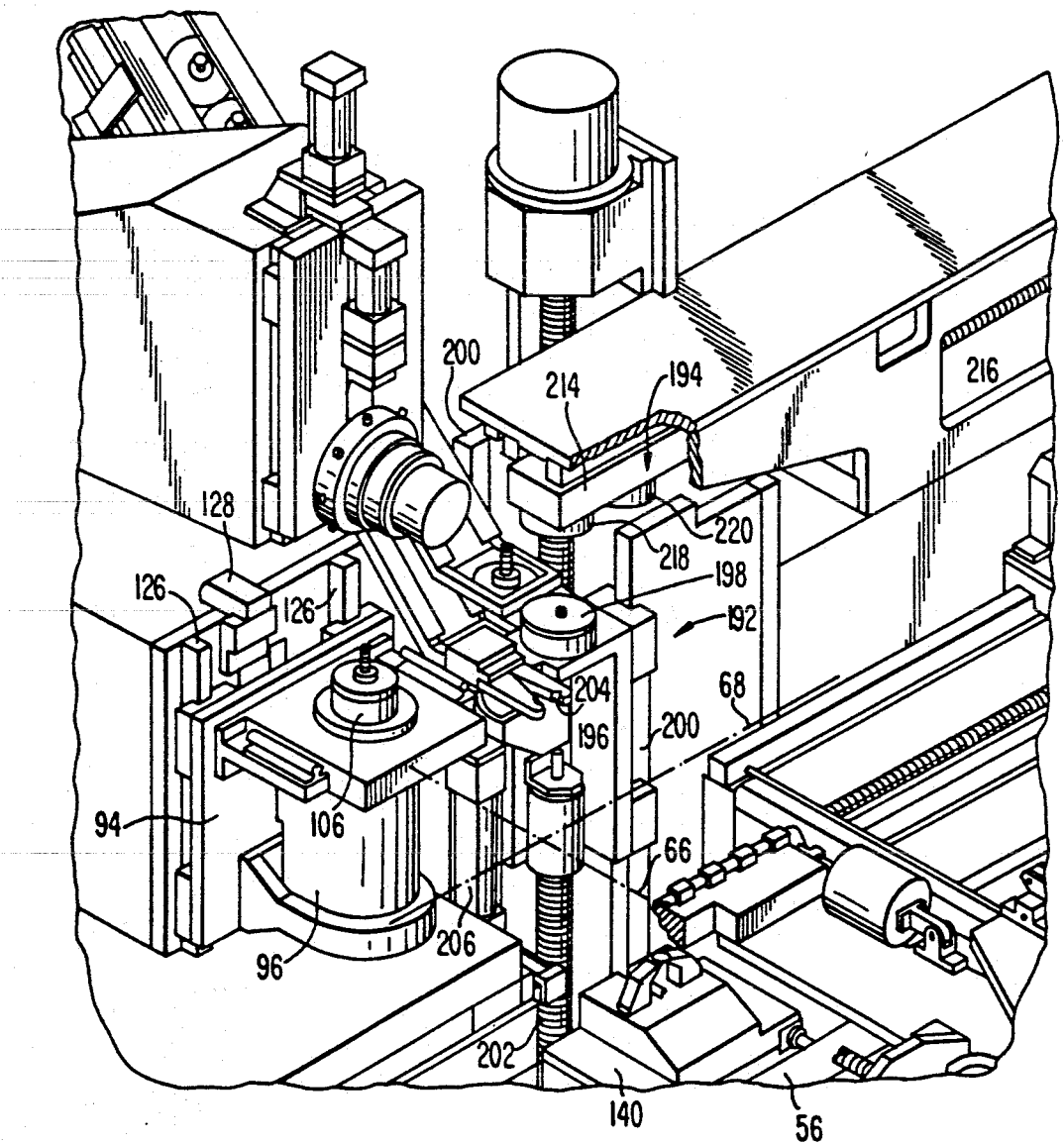
FIG. 6 is a partially cut-away perspective view of the invention with the chuck assembly in the transfer station.
Figure 12:
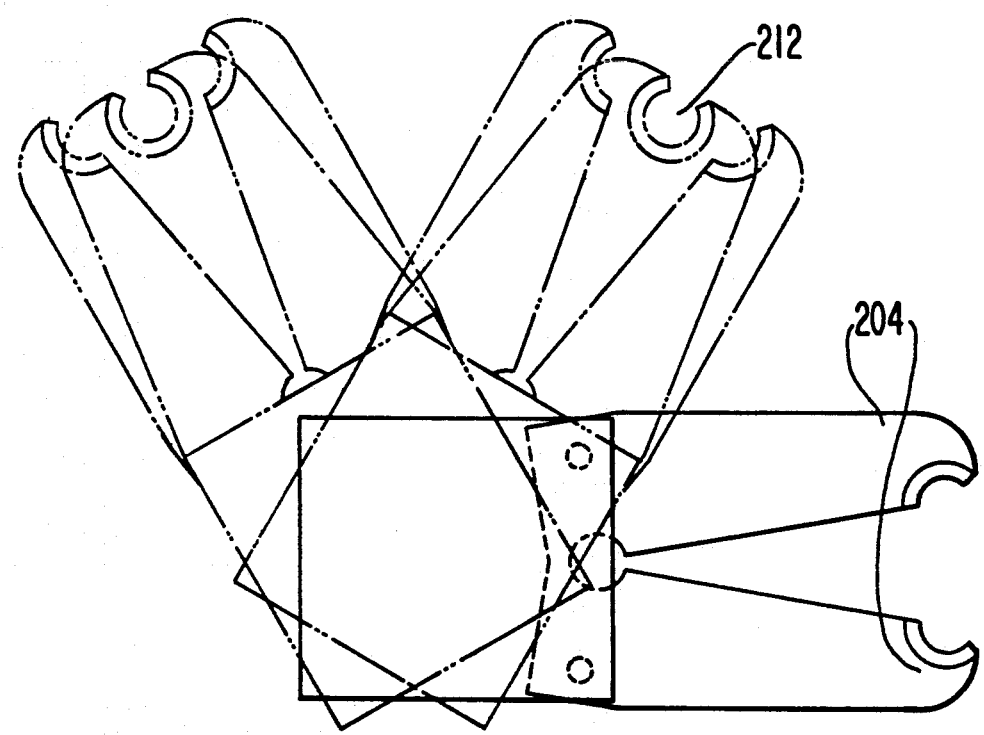
FIG. 12 is a diagramatic plan view of the gripper element of the invention.

In accordance with the invention, the automated drilling station comprises means for transferring the selected drill bit between the storing means and the chuck assembly at a transfer station remote from the work position. In a preferred embodiment as depicted in FIGS. 6, 11 and 12, the transferring means comprises a gripper assembly 192 and a transfer drive assembly 194.

Gripper assembly 192 includes a gripper unit 196 and a transfer platform 198 each functionally supported by mounting platform 199. Mounting platform 199 is connected to ways 200 for selective movement along a transfer axis perpendicular to the plane of the work position. Drive screw 202 and associated driving motor 201 selectively moves mounting platform 199 in response to signals directing drill bit transfer.

Gripper unit 196 includes gripper arms 204 mounted to mounting platform 199 for limited movement along a gripper axis parallel to the transfer axis and for rotational movement about the gripper axis. Drive cylinder 206 selectively controls movement of gripper arms 204 along the gripper axis. Rotational cylinders 208 selectively rotate gripper arms 204 about the gripper axis. Gripper arms 204 are selectively movable between open and closed positions by gripper cylinder 210. When closed, gripper arms 204 define an opening 212 so shaped to engage recess 110 in shaft 108 of adaptor 104 as depicted in FIG. 4.

Transfer platform 198 is disposed in fixed relationship to gripper arms 204. Transfer platform 198 preferably includes electromagnetic means for selectively rendering the platform magnetic to attract and hold drill bit adaptors 104 placed in proximity to the surface of platform 198.

Gripper assembly 192 is disposed with respect to terminal platforms 176 of feed racks 174 so that gripper arms 204 may selectively engage adaptors 104 in each of terminal platforms 176. Gripper assembly 192 is movable along ways 200 to place gripper unit 196 in position to engage the selected adaptor 104 in one of the six selected terminal platforms 176.

Transfer drive assembly 194 is disposed in fixed relation to gripper assembly 192 and includes beam 214 disposed for selective movement on an axis perpendicular to the transfer axis between positions aligned with transfer platform 198 and with chuck 100 in the transfer station. Ball screw 216 selectively moves beam 214. The end of beam 214 includes two adajcent electromagnetic receivers 218, 220 each of which may be selectively positioned in alignment with transfer platform 198 and chuck 100 in the transfer station. Each of receivers 218, 220 may be selectively activated to generate a magnetic attraction for attracting and holding adaptors 104 placed in proximity to receivers 218, 220 by either transfer platform 198 or chuck 100 in the transfer station.

The transferring means operates to selectively transfer drill bits from chuck 100 and selected terminal platforms 176 of feed racks 174. If drill bit 102 in adaptor 104 on chuck 100 is to be changed, chuck 100 is moved to the transfer station by means to be described below. Gripper assembly 192 is moved along ways 200 in order to be adjacent the selected terminal platform 176. Gripper arms 204 are raised relative to mounting platform 199 by cylinder 206 and are rotated by cylinders 208 to a position to engage adaptor 104 located in the selected terminal platform 176. After gripper arms 204 are lowered by cylinder 206 and closed by cylinder 210 to engage adaptor 104, arms 204 are raised and rotated to place selected adaptor 104 in proximity to transfer platform 198. Gripper arms 204 are opened and electromagnetic means in transfer platform 198 secure adaptor 104 thereto. Gripper assembly 192 is then translated on transfer axis to the proximity of receiver 218. Activating electromagnetic means in receiver 218 and deactivating the electromagnetic means in transfer platform 198 transfers adaptor 104 to receiver 218. Beam 214 is then translated to place receiver 220 in coaxial relation to chuck 100 in the transfer position. Power cylinder 132 is then directed to raise chuck 100 into proximity with receiver 220. Electromagnetic means in chuck 100 is then disabled and the electromagnetic means in receiver 220 enabled to transfer adaptor 104 on chuck 100 to receiver 220. Beam 214 is then translated to align receiver 218 with chuck 100 and the electromagnetic means are reversed to transfer the new adaptor to chuck 100 from receiver 218. Beam 214 is then translated to place receiver 220 in alignment with transfer platform 198 and electromagnetic means are reversed to transfer adaptor 104 to the transfer platform. Gripper assembly 192 is then translated along ways 200 to place it adjacent the terminal platform of the appropriate feed rack 174 and grippers 204 are used to return adaptor 104 to the terminal platform.

Figure 14:
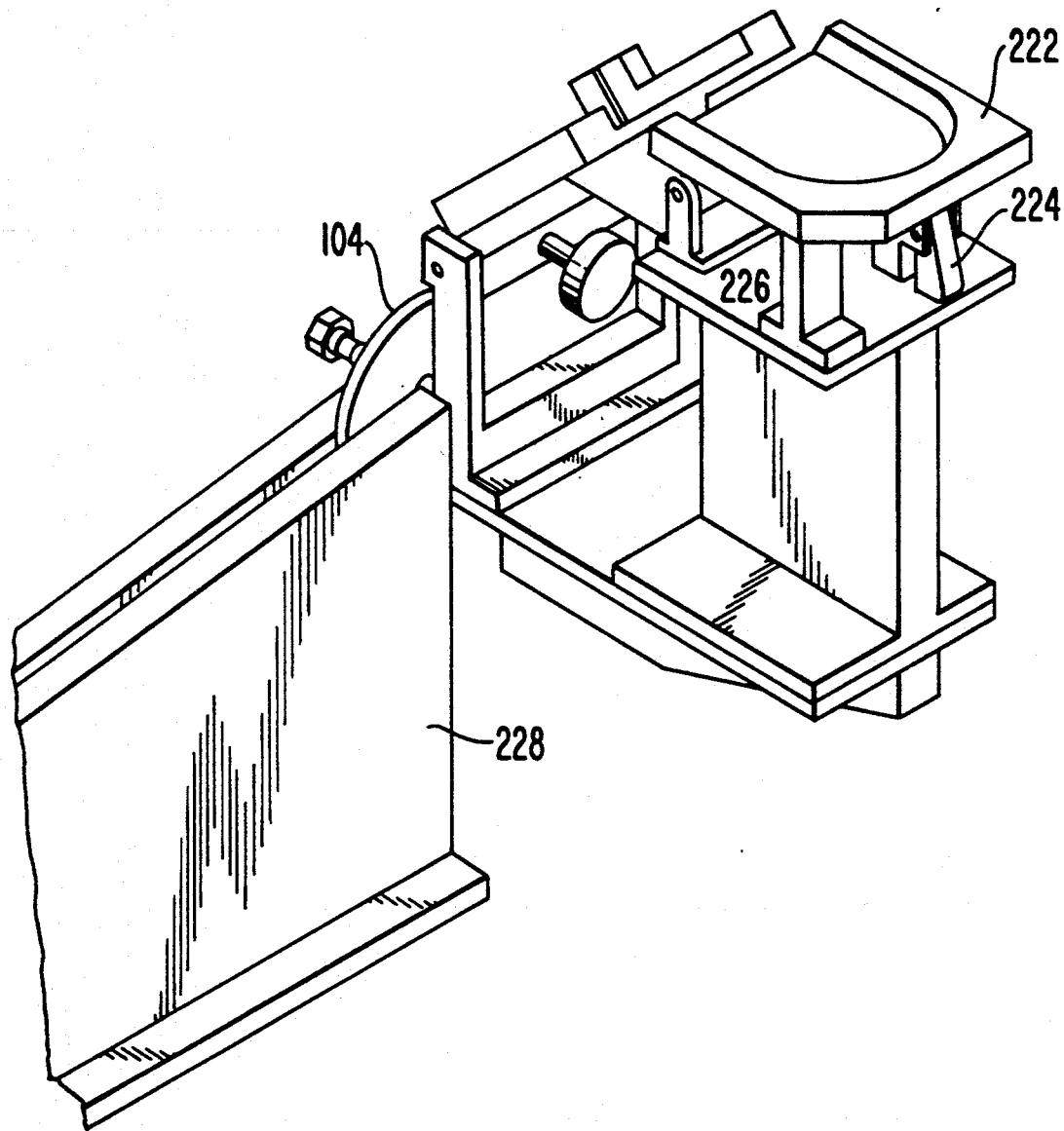
FIG. 14 is a perspective view of a portion of the drill bit storage and transfer mechanism of the invention for discarding worn or broken drill bits.
Figure 16:
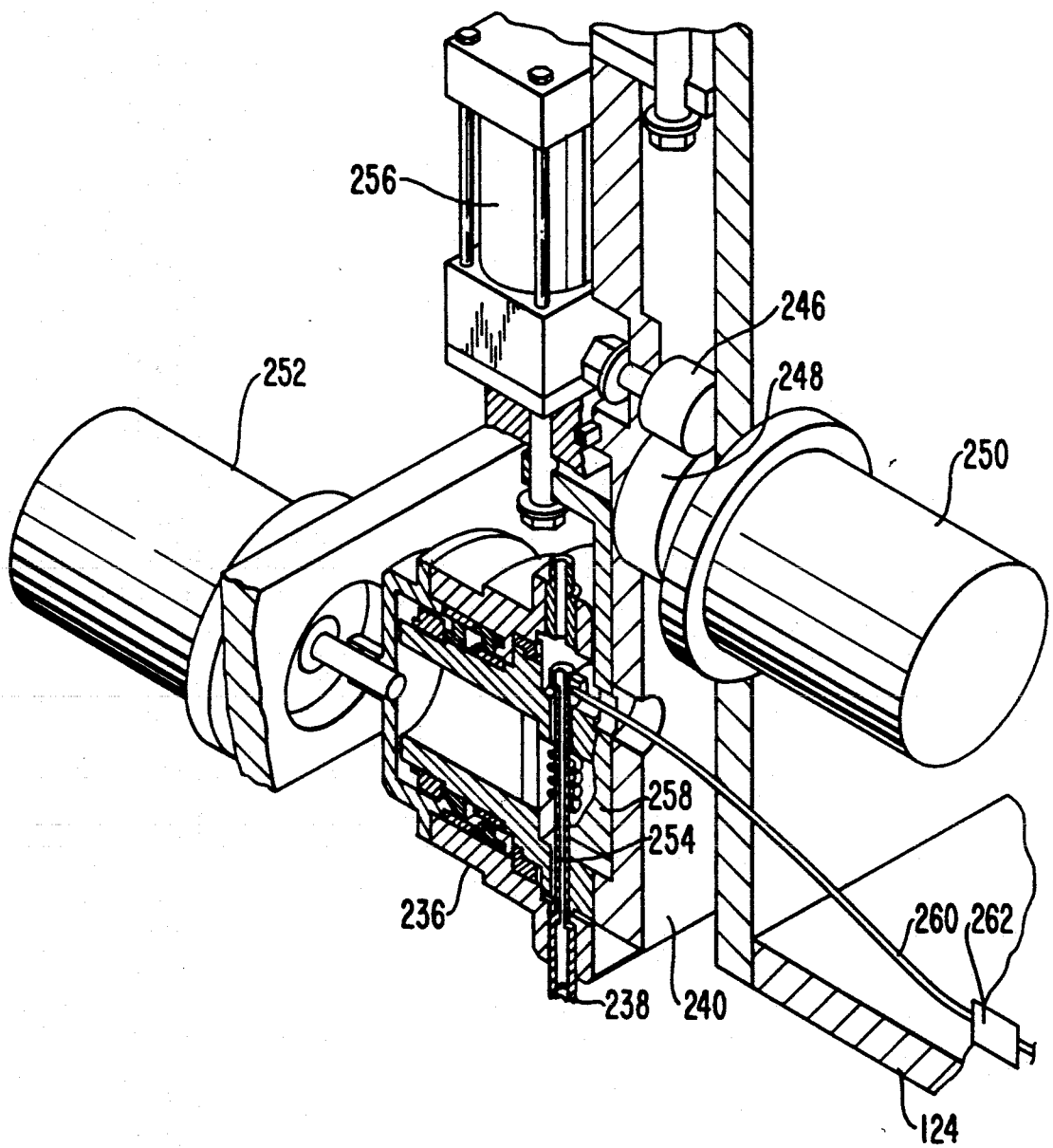
FIG. 16 is a partial cut-away perspective view of the bushing turret of the invention.

In a preferred embodiment, the transferring means further includes means responsive to a signal indicating a worn or damaged drill bit for selectively disposing of such drill bits. Where the computer control system determines that a drill bit removed from chuck 100 in the transfer station is worn because of the number of operations performed or is broken, in the way described below, the computer may direct the transfer means to dispose of the drill bit. In such event, after the worn or broken drill bit and adaptor are disposed on transfer platform 198, gripper assembly 192 is selectively moved along the transfer axis to a position adjacent disposal platform 222. On reaching this position, gripper arms 204 are used as previously described to transfer adaptor 104 from transfer platform 198 to disposal platform 222. Mounting platform 199 is so disposed as to engage dog 224 (FIGS. 14, 15) on movement into position adjacent disposal platform 222. Dog 224 is spring biased to allow mounting platform 199 to move into transfer position with respect to disposal platform 222. On movement of mounting platform 199 from position adjacent disposal platform 222, mounting platform 199 moves dog 224 to effect pivoting action about pivot 226 of disposal platform 222 to dump adaptor 104 into disposed adaptor receiver 228. Disposal platform 222 is located in alignment with terminal platforms 176 of feed racks 174. A counterweight is attached to disposal platform 222 to return it to its original position after gripper assembly 192 is moved from the position adjacent the disposal platform.

Figure 10:
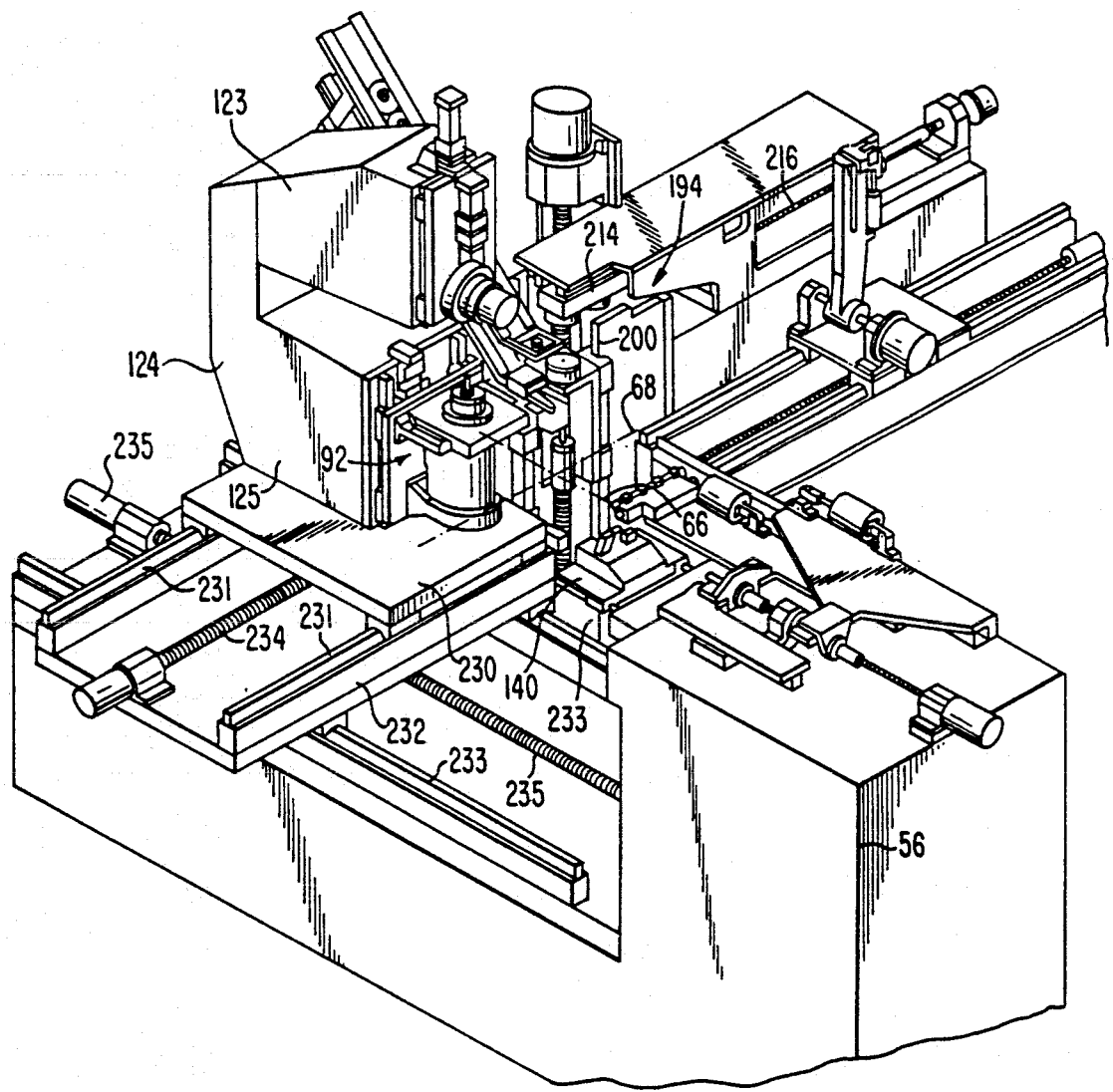
FIG. 10 is a partially cut-away perspective view of the automated drilling station of the invention with the chuck assembly in the transfer station.

In accordance with the invention, the automated drilling station comprises means for selectively translating the chuck assembly between the transfer station and work position and between locations on one side of the work piece aligned with predetermined drill points in the work position. As best seen in FIG. 10, housing 124 operatively supporting chuck assembly 92 is supported on base plate 230 which is mounted on ways 231 of base plate 232 for movement parallel to the Y axis 68. Base plate 232 is mounted on ways 233 on base 56 for movement on the X axis 66. Orthogonally related drive screw and motor assemblies 234, 235 selectively move base plates 230 and 232 to translate housing 124 and chuck assembly 92 along the X and Y axes. Base plates 230, 232 are disposed to permit chuck assembly 92 to be placed in the transfer station as depicted in FIG. 10 for exchange of drill bits and adaptors and to permit movement of chuck assembly 92 into operative axial alignment with predetermined drilling locations defined in the work position as depicted in FIG. 2.

Housing 124, as may be seen in FIG. 10, has essentially a C-shape having upper and lower parts 123, 125. Chuck assembly 92 is mounted to lower part 125 of housing 124. When moved to the work position, frame 58 is disposed in the gap between upper and lower parts 123, 125 of housing 124 thereby placing chuck assembly 92 on one side of a work piece disposed in the work position. Computer control of drive and ball screw assemblies 234, 235 move the chuck assembly to selected drilling locations in the work position.

In accordance with the invention, the automated drilling station further comprises means for selectively disposing a bushing having a size corresponding to the selected drill bit on the other side of the work piece aligned with the predetermined drilling locations in opposed relation to the chuck assembly. As here embodied and depicted in FIGS. 3, 6, 9 and 16, the disposing means comprises a turret 236 including a plurality of bushings 238 circumferentially disposed about the periphery of turret 236. Bushings 238 are of various predetermined sizes corresponding to the various predetermined sizes of drill bits 102. Turret 236 is mounted to plate 240 for rotation about an axis parallel to the plane of the work position. Plate 240 is mounted to upper portion 123 of housing 124 disposing turret 236 in opposed relation to chuck assembly 92. Plate 240 is mounted on ways 242 (FIG. 3) for movement on an axis perpendicular to the plane of the work position between a first position remote from a work piece in the work position and a second position wherein the selected bushing 238 is disposed a predetermined axial distance from a work piece in the work position. Motor 252 selectively rotates turret 236 with respect to plate 240 to dispose a selected bushing 238 in opposed relation to chuck assembly 92.

Plate 240 includes cam follower 246 which is disposed to engage cam 248 when plate 240 is in the second position. Cam 248 is supported by housing 124 for selective rotation by cam motor 250. In the second position, housing 124 is translated to a predetermined drilling location at which motor 250 rotates cam 248 to lower turret 236 placing selected bushing 238 in contact with work piece 90 in the work position in opposition to contact surface 150 of drill guard 140.

Selective rotation of turret 236 is effected by motor 252. Spring biased pin 254 is disposed in selected bushing 238 to hold turret 236 in the selected position. For rotation, cylinder 256 is selectively activated to raise link 258 moving pin 254 against the spring bias and out of engagement with selected bushing 238 thereby permitting rotation of turret 236. Once the turret achieves a new desired location, cylinder 256 lowers link 258 allowing pin 254 to be coaxially inserted into selected bushing 238 to hold turret 236 in place.

Preferably the invention includes means for sensing completion of a hole drilled in the work piece 90 by a selected drill bit. In a preferred embodiment depicted in FIG. 16, air pressure is conducted via line 260 through the bore of pin 254 and the bore of bushing of 238. With selected bushing 238 in abutting contact with work piece 90 in the work position, a predetermined air pressure is maintained. After drilling a hole in work piece 90 and withdrawing the drill bit, a drop in air pressure through the hole in work piece 90 is sensed by sensor 262. A signal from sensor 262 of an appropriate drop in the air pressure generates computer command signals to rotate cam 248 raising turret 236 to the second position and permitting movement of housing 124 to the next drilling point.

The invention also preferably includes means for determining when a drill bit is broken in a hole in the work piece. As here embodied, the determining means includes an eddy current probe 264 disposed on the periphery of turret 236. On failure to sense an air pressure drop, the computer rotates turret 236 to place eddy current probe 264 adjacent the work piece. If eddy current probe 264 senses a resistance in the work piece indicative of a drill bit broken the hole, the command computer signals discard of the work piece.

It will be apparent to those skilled in the art that various modifications and variations may be made to the automated drilling station of the invention without departing from the scope of spirit of the invention.

What is claimed is:

1. An automated drilling station for use in a computer controlled manufacturing system, said drilling station comprising:

means adjustably defining a planar work position having a central reference point for releasably clamping a planar work piece in said work position;

a chuck assembly adapted to operatively receive a selected drill bit;

means for selectively moving said chuck assembly on an axis perpendicular to the plane of said work position;

means for storing a plurality of drill bits of various predetermined sizes;

means operable independently of said chuck assembly for transferring said selected drill bit between said storing means and said chuck assembly at a transfer station remote from said work position;

means for selectively translating said chuck assembly between said transfer station and said work position and between locations on one side of said work piece aligned with predetermined drilling locations in said work position; and means for selectively disposing a bushing having a size corresponding to said selected drill bit on the other side of said work piece aligned with said predetermined drilling drill locations in opposed relation to said chuck assembly.

2. The drilling station of claim 1 wherein said clamping means comprises a base, a cantilever frame including opposed side elements extending from said base to a first support ledge remote from said base, a second support ledge disposed on said base in spaced opposition to said first support ledge, said side elements and support ledges defining said work position, means responsive to the dimensions of said work piece for proportionally varying the spacing between said support ledges to maintain equidistant spacing from said reference point and to receive opposed edges of said work piece, a clamp attached to each support ledge for movement therewith, and means for selectively shifting said clamps between clamped positions securing said work piece in said work position and an open position releasing said work piece.

3. The drilling station of claim 2 wherein said varying means comprises a motor and drive screw structure fixed to said base which simultaneously moves said side elements and first ledge and said second ledge relative to each other to vary one transverse dimension of said work position in response to signals representative of that transverse dimension of said work piece.

4. The drilling station of claim 3 wherein said shifting means comprises a separate command cylinder and actuating lever assembly connected to each said clamp and supported for movement therewith, the cylinder of each said assembly being responsive to signals representative of placement of a work piece in said work position and of completion of work on the work piece.

5. The drilling station of claim 1 wherein each of said plurality of drill bits includes an adaptor comprising a generally planar, annular base and an integral shaft extending from the center of one side of said base to a distal end, said drill bit being removably secured in the distal end of said shaft.

6. The drilling station of claim 5 wherein said chuck assembly comprises a support plate, a drive motor supported by said plate and including a drive shaft selectively rotatable by said motor, an armature fixed to said drive shaft for rotation therewith, and means for selectively fixing the base of each said drill bit adaptor to said armature for rotation therewith.

7. The drilling station of claim 1 wherein said chuck assembly includes a support plate, a chuck for fixedly receiving said selected drill bit, and a drive motor supported by said support plate, said chuck being connected to said drive motor for selective rotation thereby.

8. The drilling station of claim 7 wherein said moving means comprises a housing supporting said support plate for limited movement on an assembly axis perpendicular to the plane of the work position, a power cylinder supported by said housing and connected to said support plate to selectively move said support plate, chuck and drive motor between axially-spaced steps, and cam drive means for selectively reciprocating said chuck and drive motor relative to said support plate along a cam axis parallel to said assembly axis.

9. The drilling station of claim 8 wherein said cam drive means comprises a cam drive motor fixed to said housing means fixing said drive motor to said support plate for slidable movement along said cam axis, a cam supported by said housing for selective rotation by said cam drive motor, and a cam follower fixed to said drive motor and disposed for operative engagement by said cam.

10. The drilling station of claim 5 wherein said storing means comprises a plurality of feed racks, each feed rack including a terminal platform and being adapted to contain a plurality of adaptors each including a drill bit of one predetermined size, the feed racks being so disposed that gravity biases adaptors contained therein toward their respective platform, and each feed rack further including means for selectively permitting only one adaptor at a time to move to its respective platform.

11. The drilling station of claim 10 wherein said permitting means comprises a cam element pivotally fixed to said feed rack remote from the respective platform and disposed to engage the base of an adaptor in said feed rack, said cam element being so shaped that pivotal movement thereof releases said engaged adaptor for movement to the respective platform and engages the following adaptor in said feed rack, and means responsive to a signal representative of a need for a drill bit in the respective platform for releasing said ca for pivotal movement.

12. The drilling station of claim 10 wherein said transferring means comprises means for replacing the selected drill bit in said chuck at said transfer station with a drill bit disposed on the terminal platform of on of said feed racks.

13. The drilling station of claim 12 wherein said replacing means includes a selectively moveable robot gripper disposed to selectively engage the adaptor of a drill bit on any of the terminal platforms of said feed racks.

14. The drilling station of claim 13 wherein said robot gripper is operatively fixed to a transfer carriage selectively moveable relative to the terminal platforms of said feed racks on a first axis perpendicular to the plane of said work position, said gripper including gripper arms moveable between closed and open positions gripping and releasing drill bit adaptors, respectively, means for selectively actuating said gripper arms between said closed and open positions means for moving said gripper arms relative to said transfer carriage on a second axis parallel to said first axis, and means for selectively rotating said gripper arms about said second axis.

15. The drilling station of claim 14 wherein said transferring means also includes a transfer platform fixed to said transfer carriage for movement therewith and disposed to receive the base of a drill bit adaptor, said transfer platform including first electromagnetic means for selectively magnetically securing a drill bit adaptor to said transfer platform, and a transfer carriage assembly including a transfer receiver, a second electromagnetic means for selectively magnetically securing a drill bit adaptor to said transfer receiver, and means for selectively displacing said transfer receiver between first and second positions on an axis perpendicular to said first axis, said first position being axially opposed to said transfer platform and said second position being axially opposed to said chuck in said transfer station.

16. The drilling station of claim 15 wherein said chuck includes third electromagnetic means for selectively magnetically securing the base of a drill bit adaptor to said chuck.

17. The drilling station of claim 1 wherein said transferring means further includes means responsive to a signal indicating a worn or damaged drill bit for selectively disposing of drill bits.

18. The drilling station of claim 8 wherein said translating means comprises a two axis platform supporting said housing and a drive assembly connected to said two axis platform for selectively moving said housing on one or both of two perpendicular axes defining a plane parallel to the plane of said work position.

19. The drilling platform of claim 1 wherein said disposing means comprises a turret including a plurality of bushings circumferentially spaced about its periphery, said bushings being of various predetermined sizes corresponding to the various predetermined sizes of said drill bits, means for selectively placing said turret in alignment with predetermined drilling locations, and means for selectively rotating said turret to place a selected bushing in opposed relation to said chuck at said predetermined drilling locations.

20. The drilling station of claim 18 wherein said disposing means comprises:
a turret including a plurality of bushings circumferentially spaced about its periphery, said bushings being of various predetermined sizes corresponding to the various predetermined sizes of said drill bits, said turret being connected to said housing for movement therewith in opposed relation to said chuck;
means for selectively shifting said turret relative to said housing on an axis perpendicular to the plane of said work position between first and second positions; and
means for selectively rotating said turret to place a selected bushing in opposed relation to said chuck at said predetermined drilling locations.

21. The drilling station of claim 20 wherein said housing is formed in two integral sections separated by a slot disposed to selectively receive the work piece in said work position, said chuck assembly being supported by one said section for operation on said one side of the work piece and said turret being supported by the other said section for operation on said other side of the work piece.

22. The drilling station of claim 21 wherein the first position of said turret is remote from the work piece in said work position and the second position of said turret disposes said selected bushing a predetermined axial distance from said work piece.

23. The drilling station of claim 1 also including means for sensing completion of a hole drilled in said work piece by said selected drill bit.

24. The drilling station of claim 22 also including means for sensing completion of a hole drilled in said work piece by said selected drill bit 25. The drilling station of claim 24 wherein said sensing means comprises means for conveying predetermined air pressure through the bore of said selected bushing and an air pressure sensor to sense a drop in said air pressure representative of removal of a drill bit from a hole drilled in said work piece.

26. The drilling station of claim 1 also including means for determining when a drill bit is broken in a hole in said work piece.

27. The drilling station of claim 25 also including means responsive to a failure of said air pressure sensor to note a drop in said air pressure for determining if a drill bit is broken in said hole in the work piece.

28. The drilling station of claim 27 wherein determining means comprises an eddy current probe disposed on the periphery of said turret for disposition proximate the hole in the work piece for which no drop in air pressure was sensed.

29. The drilling station of claim 1 also including a drill guard selectively connectable to said chuck assembly for disposition between said chuck assembly and the one side of said work piece in said work position.

30. The drilling station of claim 8 also including a drill guard having a contact surface and a bore therein and being selectively connectable to said mounting plate for disposition of said contact surface between said chuck and the one side of said work piece in said work position.

31. The drilling station of claim 30 also including means for supporting said drill guard proximate said work position, means on said mounting plate for selectively engaging said drill guard in a position wherein said bore is coaxially aligned with a drill bit in said chuck, means on each of said supporting and engaging means for selectively fixing thereto and releasing therefrom said drill guard in cooperation with said fixing and releasing means on the other of said supporting and engaging means.

* * * * *

UNITED STATES PATENT AND TRADEMARK OFFICE
CERTIFICATE OF CORRECTION

PATENT NO. : 5,081,763
DATED : January 21, 1992
INVENTOR(S) : EVERETT E. JONES It is certified that error appears in the above-identified patent and that said Letters Patent is hereby corrected as shown below:

IN THE CLAIMS:

Column 9, line 58, delete "drill".

Column 11, line 10, change "ca" to --cam--.

Column 11, line 15, change "on" to --one--.

Column 12, line 40, after "bit" insert --.--.

Signed and Sealed this

Twentieth Day of April, 1993

*Attest:*

MICHAEL K. KIRK

*Attesting Officer*   *Acting Commissioner of Patents and Trademarks*